United States Patent
Lehn et al.

(10) Patent No.: US 10,388,164 B2
(45) Date of Patent: Aug. 20, 2019

(54) METHOD AND SYSTEM FOR DETECTING AN UNOCCUPIED REGION WITHIN A PARKING FACILITY

(71) Applicant: Robert Bosch GmbH, Stuttgart (DE)

(72) Inventors: Andreas Lehn, Ludwigsburg (DE); Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 16/038,371

(22) Filed: Jul. 18, 2018

(65) Prior Publication Data

US 2019/0027037 A1  Jan. 24, 2019

(30) Foreign Application Priority Data

Jul. 19, 2017 (DE) .......... 10 2017 212 381
Jul. 20, 2017 (DE) .......... 10 2017 212 513

(51) Int. Cl.
  *G08G 1/14* (2006.01)
  *G06T 7/73* (2017.01)
  *G06K 9/00* (2006.01)

(52) U.S. Cl.
  CPC .......... *G08G 1/142* (2013.01); *G06K 9/00758* (2013.01); *G06K 9/00771* (2013.01); *G06K 9/00785* (2013.01); *G06T 7/74* (2017.01); *G08G 1/146* (2013.01); *G06K 2009/00738* (2013.01); *G06T 2207/30232* (2013.01)

(58) Field of Classification Search
  None
  See application file for complete search history.

(56) References Cited

U.S. PATENT DOCUMENTS

| | | | |
|---|---|---|---|
| 6,107,942 A | 8/2000 | Yoo et al. | |
| 2005/0002544 A1* | 1/2005 | Winter | G08G 1/14 382/104 |
| 2015/0138001 A1 | 5/2015 | Davies et al. | |
| 2017/0351267 A1* | 12/2017 | Mielenz | B60W 30/06 |

\* cited by examiner

*Primary Examiner* — John F Mortell
(74) *Attorney, Agent, or Firm* — Norton Rose Fulbright US LLP; Gerard Messina

(57) ABSTRACT

A method for detecting an unoccupied region within a parking facility, using at least one environment sensor disposed in a stationary manner within the parking facility, is furnished, at least encompassing the following: sensing measured data of at least one segment of the parking facility by way of at least one environment sensor; comparing the measured data with reference measured data in order to recognize a change in the segment of the parking facility; and detecting the segment as an unoccupied or non-unoccupied region as a function of the recognition of a change.

23 Claims, 3 Drawing Sheets

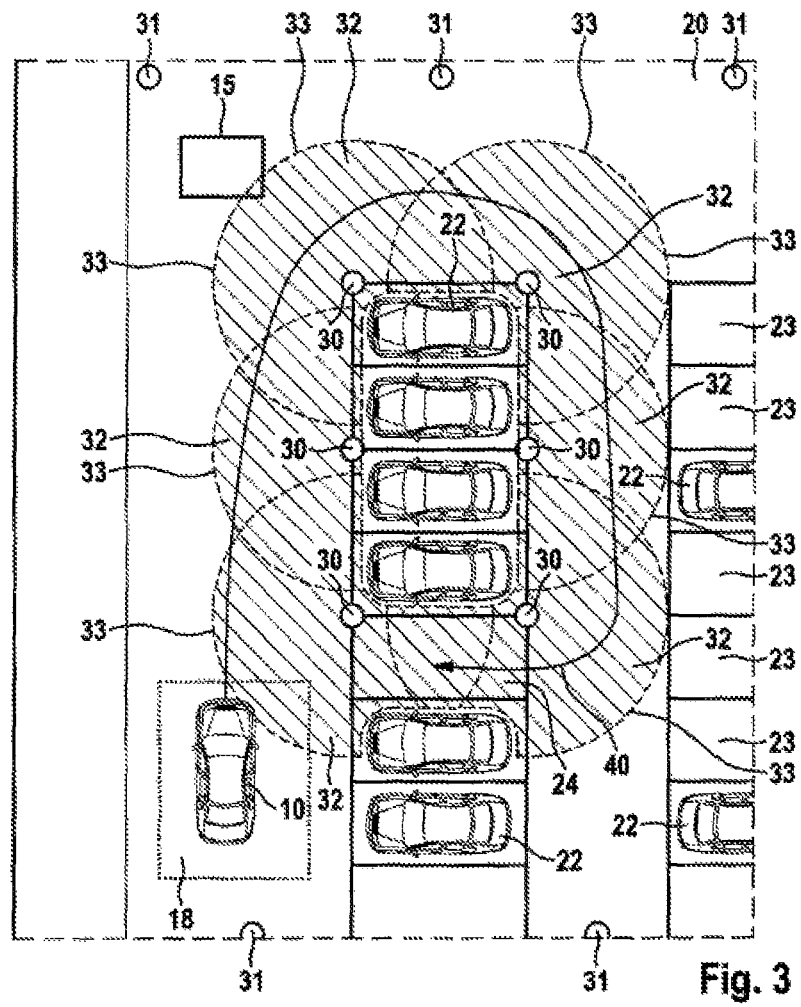
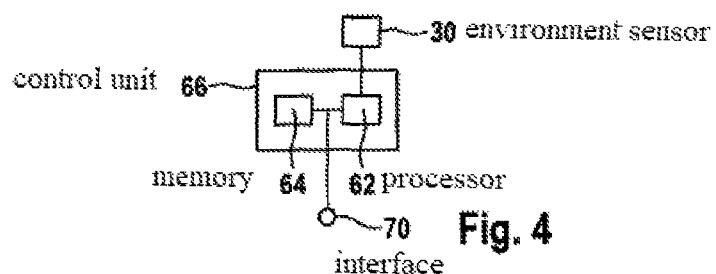
Fig. 3
Fig. 4

METHOD AND SYSTEM FOR DETECTING AN UNOCCUPIED REGION WITHIN A PARKING FACILITY

RELATED APPLICATION INFORMATION

The present application claims priority to and the benefit of German patent application no. 10 2017 212 381.8, which was filed in Germany on Jul. 19, 2017, and German patent application no. 10 2017 212 513.6, which was filed in Germany on Jul. 20, 2017, the disclosures which are incorporated herein by reference.

FIELD OF THE INVENTION

The present invention relates to a method for detecting an unoccupied region within a parking facility, for example a parking structure, in particular an unoccupied region within a travel envelope of a parking facility. The invention further relates to a system for detecting an unoccupied region within a parking facility, for example a parking structure, in particular an unoccupied region within a travel envelope of a parking facility. The invention further relates to a parking facility. The invention further relates to a computer program.

BACKGROUND INFORMATION

German Published Application DE 10 2015 201 209 A1 discusses a valet parking system for automatically conveying a vehicle from a transfer zone to an assigned parking space within a predefined parking area. The known system encompasses a parking facility monitoring system having at least one sensor unit disposed in a stationary manner. The parking facility monitoring system is embodied to localize the vehicles driving within the predefined parking area.

Driver assistance systems and systems for highly automated (autonomous) driving are also known from the existing art. Such systems can use, for example, one or several sensors that survey and/or analyze a three-dimensional space. The objective here is that any objects and obstacles be detected. The dimensions (height, width, depth) of the detected objects must furthermore be ascertained with a high degree of reliability and accuracy. High accuracy is necessary, for example, if trajectories for the vehicle for driving past the object need to be ascertained. Numerous measurement points on the objects at different heights are often the basis or precondition for these calculations. A further boundary condition is that the system does not know the environment, since it is not possible to run through the entire world in advance. The result of this is that driver assistance systems as a rule need an image of the three-dimensional space in order to make decisions. This is necessary in particular if the systems act in a highly automated or autonomous manner.

SUMMARY OF THE INVENTION

An object on which the invention is based is to be regarded as that of furnishing a concept for efficient detection of an unoccupied region within a parking facility, for example a parking structure, in particular an unoccupied region within a travel envelope of a parking facility.

This object may be achieved by way of the respective subject matters of the descriptions herein. Advantageous embodiments of the invention are the subject matter of respective further descriptions herein.

According to a first aspect of the invention, a method for detecting an unoccupied region within a parking facility, using at least one environment sensor disposed in a stationary manner within the parking facility, is furnished, at least encompassing the following steps:
  sensing measured data of at least one segment of the parking facility by way of at least one environment sensor;
  comparing the measured data with reference measured data in order to recognize a change in the segment of the parking facility; and
  detecting the segment as an unoccupied or non-unoccupied region as a function of the recognition of a change.

One or several of the environment sensors that are used can be embodied, for example, as lidar sensors, radar sensors, ultrasonic sensors, or other variants of so-called "time-of-flight" sensors. The environment sensors embodied as time-of-flight sensors can have, for example, one or several measurement planes that extend(s) substantially parallel to a roadway surface of the parking facility. Alternatively or additionally, image-producing sensors such as (stereo) cameras can be used. Alternatively or additionally, for example, (surface) pressure sensors, photoelectric barriers, and/or magnetic sensors can also be used as environment sensors.

The environment sensors may be disposed in a stationary manner on an infrastructure element of the parking facility, for example a wall, a column, or the ceiling.

The form in which the detected measured data exist depends generally on the type of sensor used. With a time-of-flight sensor, for example, the measured data can exist, for instance, in the form of measurement-angle-dependent signal transit times or as distance values derived from the signal transit times. If an image-producing sensor is used as an environment sensor, the measured data can then exist, for instance, as brightness values and/or color values of pixels.

The reference measured data may exist in the same form as the measured data, thereby achieved easy comparability.

In an exemplary embodiment of the method according to the present invention, at least two environment sensors are used. A segment of the parking facility is sensed by at least two of the environment sensors, the environment sensors that are sensing the respective segment being configured differently from one another and/or implementing measurement principles that are different from one another. In other words, a segment is monitored by at least two environment sensors that are configured differently and/or that function in accordance with different measurement principles. Alternatively or additionally, provision can be made that at least two environment sensors sense a segment from different positions, i.e. have a different angle of view. This has the advantage that monitoring can be accomplished more reliably and more efficiently.

A "segment" can correspond to a measurement region of an environment sensor. The measurement region of an environment sensor can alternatively encompass several segments. A segment can encompass, for example, a specific area, for example of 2 by 2 meters.

A "parking facility" for purposes of the invention is in particular a parking facility for motor vehicles. The parking facility is, for example, a parking structure or a parking garage. A segment and/or region to be sensed is located, for example, within a travel corridor of the parking facility. In a particular embodiment of the invention at least two environment sensors are used, for each of the environment sensors measured data of the segment of the parking facility being sensed by way of the environment sensor;

the respective measured data being compared with reference measured data associated with the respective environment sensor, a change in the measured data with respect to the reference measured data being recognized for each environment sensor; and the segment being detected as an unoccupied region as a function of whether no change is recognized for a specific number of the environment sensors. For example, the segment can be detected as an unoccupied region if no change is recognized for at least one environment sensor.

The technical advantage thereby achieved is that it is possible to prevent a single incorrect detection that a region is not unoccupied, for example because of a sensor malfunction, from already resulting in detection of a non-unoccupied region.

Alternatively, the segment can be detected as an unoccupied region if no change is recognized for more than a specific proportion of the environment sensors sensing that segment, in particular more than 50% of the environment sensors used. Alternatively, the segment can be detected as an unoccupied region if no change is recognized for all the environment sensors being used. The technical advantage thereby achieved is that increased reliability is ensured simultaneously with high availability.

In an alternative embodiment of the invention at least two environment sensors are used, for each of the environment sensors measured data of the segment of the parking facility being sensed by way of the environment sensor;

the respective measured data being compared with reference measured data associated with the respective environment sensor, a change being recognized for each environment sensor; and a value characterizing the change, in particular a value between 0 and 1, being associated with each environment sensor as a function of the comparison. A respective probability is calculated as a function of the characterizing value. The segment is detected as an unoccupied region as a function of the calculated probabilities. For example, a first environment sensor that implements a first measurement principle can have associated with it, for a current sensing of a segment, the value 0.8, which denotes an 80% probability that the sensed segment is actually an unoccupied region. A second environment sensor that is sensing the same segment as the first environment sensor and, for example, implements a second measurement principle has associated with it, for a current sensing of the same segment, the value 0.5, which denotes a 50% probability that the sensed segment is actually an unoccupied region. The different outcomes can result, for example, from the different measurement principles. A collective probability can then be calculated, for instance, by multiplying the values. If the result of the calculation exceeds a specific threshold value, for example, the segment is detected as an unoccupied region. This principle can be extended to any number of environment sensors that are sensing the relevant segment.

The technical advantage thereby achieved is that the different strengths and weaknesses of various measurement principles of the environment sensors being used are taken into account, and a reliable conclusion can nonetheless be drawn as to whether or not a region is unoccupied.

In an alternative embodiment of the invention at least two environment sensors are used, for each of the environment sensors measured data of the segment of the parking facility being sensed by way of the environment sensor, the measured data of the environment sensors being combined (fused) to yield a collective measured data set, and the collective data set being compared with an associated reference measured data set in order to recognize a change in the segment of the parking facility. This can be accomplished, for example, using a so-called grid model, also referred to as "raw-data-based fusion": Firstly the segment is subdivided into several sub-segments. For each of the sub-segments, measured data (raw data) are sensed by way of the at least two environment sensors. For each of the sub-segments, the measured data (raw data) of all the environment sensors are firstly combined and compared with reference data. From the comparison, a result (unoccupied or non-unoccupied) is derived for each of the sub-regions. The decision as to whether the entire segment is detected as unoccupied or non-unoccupied is calculated as a sum over all the sub-regions. The possibility exists here of weighting the sub-regions differently.

In an exemplary embodiment of the invention, the steps of sensing measured data of at least one segment of the parking facility by way of at least one environment sensor, and of comparing the measured data with reference measured data in order to recognize a change in the segment of the parking facility, are executed several times, for example three times, in chronological succession. Detection of the segment as an unoccupied or non-unoccupied region is accomplished as a function of the frequency with which a change is recognized. For example, a segment is detected as an unoccupied region if the segment is detected as unoccupied, i.e. no change is recognized, upon at least one execution of the method steps. Alternatively, the segment can be detected as unoccupied only when the segment is detected as unoccupied at each execution, i.e. if no change is recognized at each execution. Alternatively, the segment can be detected as unoccupied when the segment is detected as unoccupied in the context of at least a specific proportion or a specific number of executions, i.e. when no change is recognized in the context of a specific proportion or specific number of executions. A result as to whether a specific segment has or has not been detected as unoccupied can thereby be efficiently verified.

A "unoccupied" region is, in particular, a region of the parking facility in which no object is present.

Detection of an object may be accomplished if a change is recognized. It is therefore possible to check, for instance by evaluating the sensed measured data, whether the change in the measured data as compared with the reference measured data has been caused by the presence of an object in the sensed region.

An "object" for purposes of the invention is any object that is present, for instance, temporarily within the parking facility, in particular within a travel envelope of a vehicle, and that at least potentially represents a collision risk for a vehicle that is moving within the parking facility. An object can be, for example, another vehicle, a person, an animal, a thing. An object is, in particular, present only temporarily within the parking facility. The stationary structures (infrastructure elements) of the parking facility, for example partitions, columns, walls, etc., are not to be considered objects for purposes of the invention.

The object is located, for example, on a floor of the parking facility, for example on a roadway or within a driving region, i.e. for example within a travel envelope, of the parking facility.

Upon recognition of a change in a segment, an object recognition may be carried out for that segment by way of at least one of the environment sensors. The object recognition may encompass a sensing of characterizing properties of the recognized object, in particular a sensing of the size and/or speed and/or object type.

Reference measured data may be sensed for each environment sensor under defined conditions (reference conditions) and stored, in particular ensuring that a reference measured value exists for every possible measurement point within the at least one segment. The defined conditions may correspond to the situation in which all segments of the parking facility which can be sensed by the relevant environment sensor are unoccupied regions. Especially in the case of distance-measuring environment sensors, the problem can arise that, for example because of the limited range of the environment sensor, no reference measured values can be measured for specific measurement points a priori because there is no static measured object, for example a wall of the parking facility, located within range of the environment sensor. In this case infrastructure elements such as reference objects or reflectors, which ensure that a reference measured value is present for every possible measurement point, can be provided in a fixed manner within the parking facility. Reflectors serve in particular to reflect signals (e.g. laser beams, ultrasonic signals, radar waves, etc.) emitted from a corresponding environment sensor back to the environment sensor with high efficiency.

The sensed measured data may be distance values. The sensing environment sensor is embodied for that purpose as a distance-measuring environment sensor, for example as a radar sensor, ultrasonic sensor, lidar sensor, or laser scanner. The reference measured data are, for example, measured data that have been sensed using the relevant environment sensor at an earlier point in time under defined conditions, for example at a point in time at which an object definitely was not located in the monitored segment. The reference measured data can also encompass averaged or mean values of such measured data sensed under defined conditions.

Reference measured data may be selected as a function of the current situation, in particular the season and/or time of day and/or weather conditions and/or lighting conditions. Reference measured values for typical situations can be furnished for that purpose, for example, in a database.

The comparison of the measured data with reference measured data encompasses, in particular, calculation of a difference.

A change is recognized in particular when, in particular in the context of a predefined minimum number of measurement points, the comparison of the measured data with the reference measured data results in a discrepancy that is greater than a predetermined tolerance value.

For purposes of this description the terms "change," "discrepancy," and "differ" also encompass, in particular, the case in which the measured values, e.g. distance values and/or remission values, differ by at least a predetermined tolerance value from a reference and/or a reference measured value and/or a reference value range. Only differences or changes that are greater than the predetermined tolerance value result in the sensing of a change and thus in detection of an object. This therefore means in particular that small differences in measured distance values and/or other measured variables, for example brightness or color, can result in the conclusion that the measured data is or are the same and/or identical, as long as the differences are less than the predetermined tolerance value.

This therefore means in particular that, for example, an unoccupied region is detected only when, for example, the measured distance values differ from the expected distance values by a difference that is less than the predetermined tolerance value.

The technical advantage that results is that an unoccupied region can be recognized efficiently and reliably by way of the environment sensor.

In the case in which at least one of the environment sensors is embodied as a distance-measuring sensor, in the present invention the detection of an unoccupied region and/or the sensing of an object are accomplished in particular by comparing at least one currently measured distance value with a reference measured value, in particular with an expected distance value. A change is sensed when, in particular in the context of a predefined minimum number of measurement points, a respective distance value which differs from an expected distance value is measured, in particular when the measured distance value is less than an expected distance value, in particular is less by at least a predetermined tolerance value. The expected distance values thus corresponding, for example, to known boundaries of the parking facility, such as walls or columns, that are located in the measurement region of the environment sensor.

In an exemplary embodiment of the invention, measured distance values are evaluated and are associated with one or several objects, the object and/or the scene constructed from several objects being classified based on the evaluation. It is thus possible, for example by evaluating successive measurements, to ascertain a motion direction and/or speed of the recognized object and thereby, for example, to estimate when the object will depart again from the segment of the parking facility so that the segment once again becomes unoccupied. Alternatively or additionally, a classification of the object type or of the scene can be carried out, in which context a speed information item can additionally be determined in order to verify the classification.

In the case in which at least one of the environment sensors is embodied as an image-producing sensor, for example as a video camera, one or several reference images can be used as reference measured data, a reference image having been recorded, for example, under defined conditions at an earlier point in time using the same image-producing sensor. The reference image can be stored in a memory unit provided for the purpose. Provision can be made, for example, that different reference images are stored as a function of the season and/or time of day; and that a reference image adapted, for example, to the current season and/or time of day is selected for comparison. The technical advantage thereby achieved is in particular that changes, for example changes in lighting conditions, that are conditional upon time of day or upon season are taken into account by the adapted reference image.

In an alternative possible embodiment of the invention, the comparison can be compared made with a chronologically previous image of the same image sequence, for example with the image acquired immediately previously. It is also conceivable to average several successive images of an image sequence and to use the averaged image as a reference image.

In a possible embodiment of the invention, a reference image sequence and/or a reference video sequence can be used, instead of an individual reference image, as reference measured data. In this embodiment, a single current camera image and/or a currently acquired video sequence can be compared with the reference image sequence. If the current image or the current image sequence and the reference image and/or the reference image sequence exhibit no changes, i.e. are the same or identical, or exhibit differences that do not exceed a maximum predetermined tolerance value, it can then be assumed that no object is present in the segment of the floor of the parking facility, i.e. that the segment is unoccupied. If an object is located in the segment of the floor of the parking facility, however, the current image will differ from the reference image by a difference that is greater than the predetermined tolerance value. If a change in the camera image with respect to a reference image or reference image sequence is recognized, one or several objects in the image can be recognized, for example, using known methods of digital image processing. For example, the object can be classified in more detail based on its dimensions and/or its geometric shape. A speed and/or a motion direction of the object or objects can furthermore be determined by comparing several camera images acquired in chronological succession. From the information obtained, the object or objects can be further classified and/or associated with a scene.

Based on the object classification or the association of the objects with a scene or with a specific obstacle (passenger car, two-wheeled vehicle, person, etc.), a recommended action can be derived for vehicles that are moving within the parking facility. That action can be conveyed, for example, to the vehicles.

The technical advantage thereby obtained is that objects can be better assessed in terms of their hazardousness or their dwell time in the relevant segment of the parking facility.

According to a second aspect of the invention, a system is furnished which is embodied for detecting an unoccupied region within a parking facility, in particular in accordance with a method embodied as described above, at least encompassing:

- at least one environment sensor, disposed in a stationary manner within the parking facility, which is embodied to sense measured data of at least one segment of the parking facility; and
- a processor
  - for comparing the acquired measured data with reference measured data in order to recognize a change in the segment of the parking facility, and
  - for detecting the segment as an unoccupied or non-unoccupied region as a function of the recognition of a change.

Technical functionalities of the system are evident analogously from corresponding technical functionalities of the method, and vice versa.

This therefore means in particular that system features are evident from corresponding method features, and vice versa.

At least one of the environment sensors is embodied in particular to sense distance values to objects in the region, in particular in a scanning plane of the environment sensor. The environment sensor can be embodied for that purpose in particular as a time-of-flight sensor, for example as an ultrasonic sensor or LIDAR sensor or radar sensor or laser scanner.

Alternatively or additionally, provision can be made that at least one environment sensor is embodied as an image-producing sensor, in particular as a camera.

The reference measured values may be stored in a memory unit provided therefor.

The processor may be embodied to combine measured data of several, in particular differently embodied, environment sensors to yield a collective measured data set, and to compare the collective measured data set with an associated reference measured data set.

According to an embodiment, provision is made that the processor is optionally embodied to detect an object if at least one current distance value measured by way of the environment sensor is less than an expected distance value, in particular is less by at least a predetermined tolerance value. Expected distance values can be stored in a memory unit provided therefor.

According to an embodiment, provision is made that the processor is optionally embodied to detect one or several objects if a current camera image differs from a reference image by at least a predefined tolerance value. The processor can implement, for that purpose, known methods of digital image processing for object recognition.

According to a third aspect of the invention, a parking facility is furnished which encompasses a system, embodied as described above, for detecting an unoccupied region located within a parking facility.

The concept according to the present invention can advantageously be used in so-called "AVP" systems, where AVP denotes "automated valet parking." In the context of such an AVP system, provision is made in particular that motor vehicles are parked automatically within a parking facility, and after a parking period has ended are automatically guided from their parked position to a pickup position at which the motor vehicle is picked up by its owner. In such systems, provision can be made that, utilizing the invention, a central infrastructure (for instance a server) sends current information regarding unoccupied regions and/or detected objects to the vehicle moving in the parking facility, in particular if an object is located within an intended driving corridor of the respective vehicle. The relevant vehicle can then be halted, for instance until the object has again disappeared. Alternatively or additionally, an alternative route and/or a deviation maneuver can also be calculated for the vehicle, which route and/or maneuver no longer leads via the floor segment of the parking facility in which the object was detected, i.e. the region that was not detected as unoccupied. The concept according to the present invention has the advantages, in particular as compared with a conventional driving assistance system and with object recognition methods used in conventional driving assistance systems, that the environment sensors that are used are mounted in a stationary manner in the parking facility, for instance on walls or columns. The field of view, i.e. the environment at which the sensor is looking, is thereby known, in particular for the case in which no object is present. It is therefore necessary merely to ascertain whether the region into which the vehicle is intended to drive is unoccupied, i.e. does not encompass an object. Because an AVP vehicle does not obligatorily need to execute a deviation maneuver since the driving region is usually predefined in AVP systems, and because in many cases it is instead sufficient for the vehicle to halt, it is not obligatorily necessary to ascertain dimensions, speeds, etc. of the detected object. It is sufficient to detect the presence of an object, for example because the speeds of AVP vehicles in the parking facility are usually very much lower (e.g. less than 10 km/h) than in road traffic (e.g. up to over 200 km/h).

The parking facility embodied in accordance with the present invention may encompass a parking facility management system for operating an automatic valet parking (AVP) system. The parking facility management system may be embodied to perform an action if a segment on an intended trajectory of a vehicle moving within the parking facility has not been detected as an unoccupied region.

The action encompasses, for example,
- transmission of a halt command to the vehicle by the parking facility management system; and/or
- transmission of a signal for speed adaptation, in particular for speed reduction, to the vehicle; and/or calculation of an alternative route based on detected unoccupied segments, and transmission to the vehicle of information for traveling the alternative route; and/or calculation of a deviation maneuver, and transmission to the vehicle of information for carrying out the deviation maneuver.

The technical advantage achieved thereby is that detection of the fact that a specific segment, soon to be traveled through by a vehicle, of the parking facility is not unoccupied can be reacted to efficiently, and a risk to the vehicle can be avoided.

According to a fourth aspect of the invention, a computer program that encompasses program code for carrying out a method according to the present invention for detecting an unoccupied region within a parking facility, when the computer program is executed on a computer, is furnished.

The invention is based on the recognition that the above object can be achieved by the fact that at least one environment sensor that can sense a segment of the parking facility is disposed within the parking facility, a "segment" being understood as a spatial region of the parking facility which is encompassed by a measurement region of the environment sensor. The segment can be, for example, a floor segment of the parking facility which has an area of, for example, 2 by 2 meters. If the environment sensor senses, at a current point in time, measured data that do not differ from predefined reference measured data, or if no change and/or discrepancy is found, the segment can be classified as a currently unoccupied region. An "unoccupied region" for purposes of the invention is a region within the parking facility in which a vehicle can move safely under normal conditions. The invention is thus based on the idea that a segment of a parking facility can be detected as unoccupied, i.e. in particular unoccupied by obstacles, if a sensing of measured data of the segment by way of the environment sensor results in no change in terms of reference measured data. A segment of the parking facility is detected as "unoccupied" if no change with respect to the reference measured data is sensed. The aim of the invention is therefore not to sense objects by way of the environment sensor, but instead at first only to recognize changes with respect the reference data values, the cause of a change being at first immaterial. In optional subsequent steps, the cause of a change that has been recognized can optionally be determined in more detail. The invention thus achieves the objective of furnishing a high level of safety for vehicles moving in the parking facility, simultaneously with high availability.

The invention will be explained in further detail below with reference to the exemplifying embodiments.

In the description below of the exemplifying embodiments of the invention, identical elements are labeled with identical reference characters, repeated description of those elements being omitted as applicable. The Figures are merely a schematic depiction of the subject matter of the invention.

BRIEF DESCRIPTION OF THE DRAWINGS

FIG. 3 is a schematic view of a parking facility having a plurality of environment sensors for detecting unoccupied regions located within the parking facility.

FIG. 4 schematically shows a system for detecting an unoccupied region located within a parking facility.

DETAILED DESCRIPTION

Figure 1:
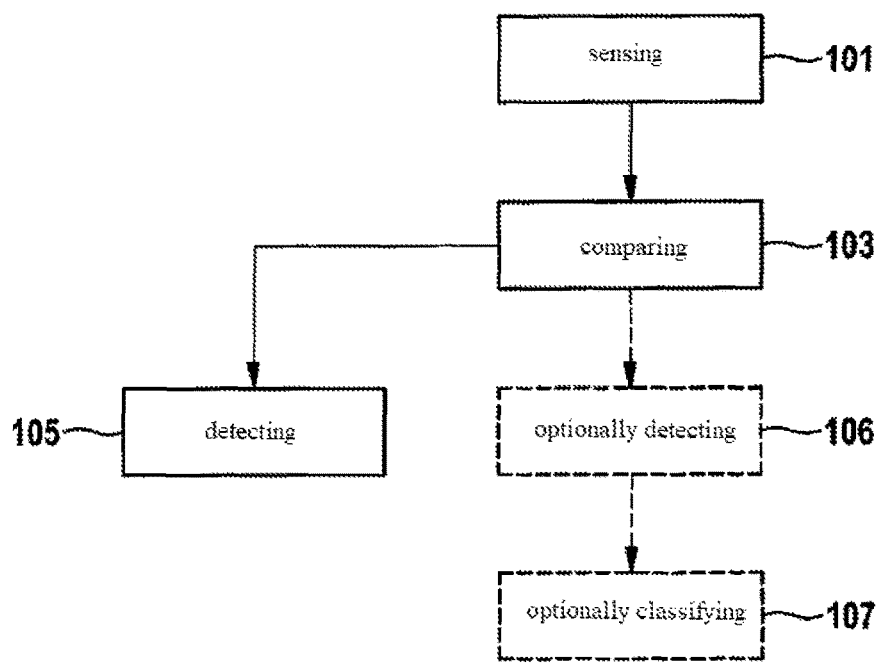
FIG. 1 is a flow chart of a method for detecting an unoccupied region located within a parking facility.

FIG. 1 shows a method for detecting a segment located within a parking facility as an unoccupied region, using at least one environment sensor that is disposed in a stationary manner within the parking facility and is embodied e.g. as a LIDAR sensor.

The method encompasses the following steps:

sensing 101 the segment of the parking facility by way of the environment sensor by sensing measured values, in particular distance values;

comparing 103 the measured values, in particular the measured distance values, with reference measured values, in particular expected distance values; and detecting 105 an unoccupied region if no discrepancy between the measured values and the reference measured values, in particular between the measured distance values and the expected distance values, is recognized; and optionally detecting 106 an object if a discrepancy is recognized; and optionally classifying 107 the object and/or associating one or several objects with a thing or with a scene.

The information that an unoccupied region or a change has been detected can be transferred, for example, to a higher-order control system. In the event that an object has been detected, that control system can, for example, stop a remotely controlled motor vehicle or transmit a stop signal to an autonomously driving motor vehicle, if an object that is located in a segment of the parking facility which lies in a driving corridor of the vehicle has been detected within the parking facility. This ensures that that motor vehicle can still be halted in a timely manner in front of the object. The control system is encompassed, for example, by a parking facility management system.

Figure 2:
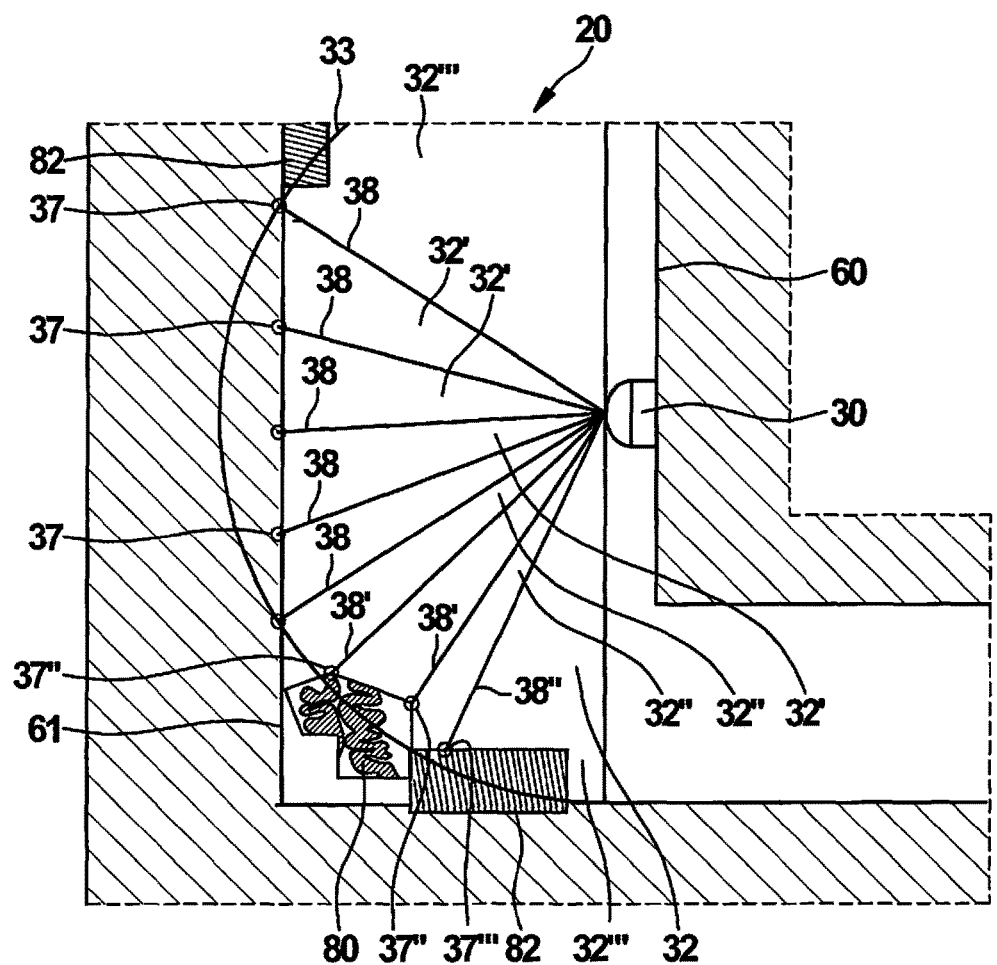
FIG. 2 schematically shows a segment of a parking facility having an environment sensor and infrastructure elements for furnishing reference measured data.

FIG. 2 shows an environment sensor 30 that is disposed within a parking facility 20 in a stationary manner on a first wall 60 of parking facility 20, the environment sensor in this example being embodied as a LIDAR sensor.

Environment sensor 30 senses or surveys a segment 32 of the parking area which corresponds to a measurement region 33 of environment sensor 30. Segment 32 has several sub-segments 32', 32", 32'''.

Located within segment 32 is a second wall 61 constituting an infrastructure element. That wall 61, or the distance to that wall, is sensed by way of environment sensor 30. This is accomplished, for example, by the fact that laser beams 38 that are emitted by environment sensor 30 are reflected by wall 61 back toward environment sensor 30. Environment sensor 30 thus receives and/or measures a corresponding reflected signal.

Wall 61 can in that regard have associated with it a plurality of measurement points 37 at which the measured time-of-flight signals are reflected back toward environment sensor 30 in the situation in which no object is located between wall 61 and environment sensor 30. Only selected measurement points are depicted by way of example in FIG. 2. The distances and/or signal times of flight associated with measurement points 37 can serve as reference measured data for a method according to the present invention.

In sub-segments 32", wall 61 is no longer within measurement region 33 of environment sensor 30. In order to allow reference measured data nevertheless to be provided for those segments 32" as well, an infrastructure element 80 can be disposed in segments 32″ in such a way that distances to that infrastructure element 80 can be sensed as measurement points 37″ and can be made available as reference measured data.

In sub-segments 32‴, wall 61 is likewise no longer within measurement region 33 of environment sensor 30. In order to allow reference measured data to be provided nonetheless for those segments 32‴ as well, a reflective infrastructure element 82 is respectively disposed in front of wall 61, at the edge of measurement region 33, so that they are located within range of environment sensor 30 and so that distances to the reflective infrastructure elements 82 corresponding to measurement points 37‴ can be sensed and made available as reference measured data.

This ensures that reference measured data can be furnished for the entire measurement region 33 of the environment sensor.

The use of a system and/or method according to the present invention in an AVP system requires that a plurality of stationary sensors (environment sensors) be used so that, if possible, the entire parking facility can be monitored. FIG. 3 thus shows, by way of example, a segment of a parking facility 20 which is part of an AVP system. The parking facility has various parking spaces 23 for AVP vehicles. Parking facility 20 encompasses a transfer zone 18 at which a vehicle 10 can be transferred to the operator of parking facility 20. For that purpose, the driver of vehicle 10 drives his or her vehicle 10 into transfer zone 18, leaves his or her vehicle, and transfers his or her vehicle 10 to the operator of parking facility 20.

For monitoring of vehicle 10 while it moves within parking facility 20, parking facility 20 has associated with it a parking facility management system that encompasses a plurality of environment sensors 20, embodied e.g. as LIDAR sensors, having measurement regions 33, as well as further environment sensors 31 embodied, for example, as stereo video cameras. Environment sensors 30 and 31 may be disposed with a distribution within parking facility 20 such that during its automated journey from transfer zone 18 to one of parking places 23, vehicle 10 always moves in a segment 32 monitored by at least one environment sensor 30, 31. Each of environment sensors 30 is embodied to sense one or several segments 32 of parking facility 20, and to detect it as unoccupied if no change with respect to predefined reference measured data is recognized. The information as to whether or not the segment is currently unoccupied can be transmitted to a parking facility management system 15.

After the transfer of vehicle 10 to the parking facility operator, one unoccupied parking space constituting a parking position 24, from among the possible unoccupied parking spaces 23, is assigned to vehicle 10 by a parking facility management system 15. Parking spaces that are already occupied are labeled in the Figure with the reference character 22.

After assignment of the parking position, vehicle 10 is moved to parking space 24 that is assigned as unoccupied. Vehicle 10 is configured, for example, to execute a driving maneuver autonomously with the aid of a parking assistance system. Access to the parking assistance system is granted to parking facility management system 15 so that vehicle 10 can move autonomously in parking facility 20 and can travel unassistedly to parking position 24. According to the present invention, corresponding information is conveyed from parking management system 15 to vehicle 10 so that, based on the information, vehicle 10 can be guided autonomously along a trajectory 40 within parking facility 20. Alternatively, vehicle 10 can be guided in a remotely controlled manner along trajectory 40 to parking position 24.

According to the invention, environment sensors 30 and 31 monitor whether the segments of the parking facility through which vehicle 10 moves during its journey along trajectory 40 to parking position 24 are unoccupied. If a segment through which vehicle 10 is intended to move is detected by one or several of the environmental sensors as not unoccupied, vehicle 10 can be stopped and/or a deviation trajectory can be calculated by parking facility management system 15, and vehicle 10 can be guided along the deviation trajectory.

FIG. 4 schematically depicts a system according to an embodiment of the invention for detecting an unoccupied region located within a parking facility. The system encompasses an environment sensor 30 as well as a processor 62 and a memory unit 64. Reference measured data, in particular various sets of reference measured data that correspond, for example, to various conditions such as seasons, times of day, weather conditions, lighting conditions, etc., are stored in memory unit 64. The processor is embodied to compare the measured data sensed by way of environment sensor 30 with a selected set of reference measured data, the set of reference measured data being selected as a function of the current conditions. A change in the sensed segment of the parking facility with respect to the reference measured data is recognized as a function of the comparison, and detection of the sensed segment as an unoccupied or non-unoccupied region is accomplished as a function of the recognition of a change. That information is made available by way of an interface 70, for example, to a parking facility management system 15. In the example depicted, processor 62 and memory 64 are integrated into a control unit 66 of environment sensor 30. Control unit 66 can be provided as an integral constituent within area sensor 30. Alternatively, processor 62 and/or memory 64 can be part of a unit existing separately from area sensor 30. For example, processor 62 and/or memory 64 can be embodied as part of a parking facility management system 15. Alternatively, processor 62 and/or memory 64 can be embodied as part of a cloud computing system. The information as to whether a segment of parking facility 20 has been detected as unoccupied can be made available, for example, via interface 70 to a vehicle that is moving in parking facility 20 and/or to a parking facility management system 15. The information can be transferred, for example, wirelessly.

What is claimed is:

1. A method for detecting an unoccupied region within a parking facility using at least one environment sensor disposed in a stationary manner within the parking facility, the method comprising:

sensing measured data of at least one segment of the parking facility by at least one environment sensor;

comparing the measured data with reference measured data to recognize a change in the segment of the parking facility; and detecting the segment as an unoccupied or non-unoccupied region as a function of the recognition of a change, wherein at least two environment sensors are used, and for each of the environment sensors:

measured data of the segment of the parking facility are sensed by the environment sensor;

the respective measured data are compared with reference measured data associated with the respective environment sensor, a change being recognized for each environment sensor; and a value, in particular between 0 and 1, characterizing the change is associated with each of the environment sensors as a function of the comparison; and a probability is calculated as a function of the characterizing value, and the segment is detected as an unoccupied region as a function of the calculated probability.

2. The method of claim 1, wherein at least two environment sensors are used, a segment of the parking facility being sensed by at least two of the environment sensors which are configured differently from one another and/or which implement measurement principles that are different from one another.

3. The method of claim 1, wherein at least two environment sensors are used, for each of the environment sensors:
  measured data of the segment of the parking facility being sensed by the environment sensor;
  the respective measured data are compared with reference measured data associated with the respective environment sensor, a change is recognized for each environment sensor; and
  the segment is detected as an unoccupied region as a function of whether no change is recognized for a specific number of the environment sensors.

4. The method of claim 3, wherein the segment is detected as an unoccupied region if no change is recognized for at least one environment sensor.

5. The method of claim 3, wherein the segment is detected as an unoccupied region if no change is recognized for more than a specific proportion of the environment sensors being used, in particular more than 50% of the environment sensors being used.

6. The method of claim 3, wherein the segment is detected as an unoccupied region if no change is recognized for all the environment sensors being used.

7. The method of claim 1, wherein at least two environment sensors are used, for each of the environment sensors measured data of the segment of the parking facility being sensed by way of the environment sensor, the measured data of the environment sensors being combined to yield a collective measured data set, and the collective data set being compared with an associated reference measured data set in order to recognize a change in the segment of the parking facility.

8. The method of claim 1, wherein upon recognition of a change in a segment, an object recognition is carried out for that segment by way of at least one of the environment sensors.

9. The method of claim 8, wherein the object recognition encompasses a sensing of characterizing properties of the object, in particular a sensing of the size and/or speed and/or object type.

10. The method of claim 1, wherein reference measured data are sensed for each environment sensor under defined conditions and stored, in particular ensuring that a reference measured value exists for every measurement point within the at least one segment which is capable of being sensed by way of the environment sensor.

11. The method of claim 1, wherein at least the tasks of sensing measured data of at least one segment of the parking facility by way of at least one environment sensor, and of comparing the measured data with reference measured data in order to recognize a change in the segment of the parking facility, are executed several times in chronological succession, detection of the segment as an unoccupied or non-unoccupied region being accomplished as a function of the frequency with which a change is recognized.

12. The method of claim 1, wherein reference measured data are selected as a function of the current situation, in particular the season and/or time of day and/or weather conditions and/or lighting conditions.

13. The method of claim 1, wherein the comparison of the measured data with reference measured data encompasses calculation of a difference.

14. The method of claim 1, wherein a change is recognized when, in particular in the context of a predefined minimum number of measurement points, the comparison of the measured data with the reference measured data results in a discrepancy that is greater than a predetermined tolerance value.

15. A system for detecting an unoccupied region within a parking facility, comprising:
  at least one environment sensor, disposed in a stationary manner within the parking facility, which is embodied to sense measured data of at least one segment of the parking facility; and
  a processor for detecting the unoccupied region within the parking facility using the at least one environment sensor disposed in the stationary manner within the parking facility, by performing the following:
    sensing measured data of at least one segment of the parking facility by at least one environment sensor;
    comparing the measured data with reference measured data to recognize a change in the segment of the parking facility; and
    detecting the segment as an unoccupied or non-unoccupied region as a function of the recognition of a change,
  wherein at least two environment sensors are used, and for each of the environment sensors:
  measured data of the segment of the parking facility are sensed by the environment sensor;
  the respective measured data are compared with reference measured data associated with the respective environment sensor, a change being recognized for each environment sensor; and
  a value, in particular between 0 and 1, characterizing the change is associated with each of the environment sensors as a function of the comparison; and
    a probability is calculated as a function of the characterizing value, and the segment is detected as an unoccupied region as a function of the calculated probability.

16. The system of claim 15, wherein at least one environment sensor is embodied to sense distance values to objects in the region, the environment sensor being embodied in particular as an ultrasonic sensor or LIDAR sensor or radar sensor or laser scanner.

17. The system of claim 15, wherein at least one environment sensor includes an image-producing sensor, in particular as a camera.

18. The system of claim 15, wherein the reference measured values are stored in a memory unit provided therefor.

19. The system of claim 15, wherein the processor is configured to combine measured data of several, in particular differently embodied, environment sensors to yield a collective measured data set, and to compare the collective measured data set with an associated reference measured data set.

20. A parking facility, comprising:
  a system for detecting an unoccupied region within the parking facility, including:
    at least one environment sensor, disposed in a stationary manner within the parking facility, which is embodied to sense measured data of at least one segment of the parking facility; and a processor for detecting the unoccupied region within the parking facility using the at least one environment sensor disposed in the stationary manner within the parking facility, by performing the following:

sensing measured data of at least one segment of the parking facility by at least one environment sensor;

comparing the measured data with reference measured data to recognize a change in the segment of the parking facility; and detecting the segment as an unoccupied or non-unoccupied region as a function of the recognition of a change, wherein at least two environment sensors are used, and for each of the environment sensors:

measured data of the segment of the parking facility are sensed by the environment sensor;

the respective measured data are compared with reference measured data associated with the respective environment sensor, a change being recognized for each environment sensor; and a value, in particular between 0 and 1, characterizing the change is associated with each of the environment sensors as a function of the comparison; and a probability is calculated as a function of the characterizing value, and the segment is detected as an unoccupied region as a function of the calculated probability.

21. The parking facility of claim 20, further comprising:
a parking facility management system for operating an automatic valet parking system, the parking facility management system being configured to perform an action if a segment on an intended trajectory of a vehicle moving within the parking facility has not been detected as an unoccupied region.

22. The parking facility of claim 21, wherein the action includes:

Transmitting a halt command to the vehicle by the parking facility management system; and/or transmitting a signal for speed adaptation, in particular for speed reduction, to the vehicle; and/or calculating an alternative route based on detected unoccupied segments, and transmitting to the vehicle of information for traveling the alternative route; and/or calculating a deviation maneuver, and transmitting to the vehicle of information for carrying out the deviation maneuver.

23. A non-transitory computer readable medium having a computer program, which is executable by a processor, comprising:

a program code arrangement having program code for detecting an unoccupied region within a parking facility using at least one environment sensor disposed in a stationary manner within the parking facility, by performing the following:

sensing measured data of at least one segment of the parking facility by at least one environment sensor;

comparing the measured data with reference measured data to recognize a change in the segment of the parking facility; and detecting the segment as an unoccupied or non-unoccupied region as a function of the recognition of a change, wherein at least two environment sensors are used, and for each of the environment sensors:

measured data of the segment of the parking facility are sensed by the environment sensor;

the respective measured data are compared with reference measured data associated with the respective environment sensor, a change being recognized for each environment sensor; and a value, in particular between 0 and 1, characterizing the change is associated with each of the environment sensors as a function of the comparison; and a probability is calculated as a function of the characterizing value, and the segment is detected as an unoccupied region as a function of the calculated probability.

* * * * *